United States Patent [19]

Imahashi et al.

[11] Patent Number: 4,938,642
[45] Date of Patent: Jul. 3, 1990

[54] PORTABLE ELECTRIC ROUTER

[75] Inventors: Toshiaki Imahashi, Hitachi; Kihachiro Matsumoto; Katsuhiko Muto, both of Katsuta; Yasunori Ogawa, Mito, all of Japan

[73] Assignee: Hitachi Koki Company, Limited, Tokyo, Japan

[21] Appl. No.: 401,303

[22] Filed: Aug. 31, 1989

[30] Foreign Application Priority Data

Sep. 2, 1988 [JP] Japan .................................. 63-220743
Sep. 2, 1988 [JP] Japan .................................. 63-220744

[51] Int. Cl.⁵ ............................ B23C 1/20; B27C 5/10
[52] U.S. Cl. ................................ 409/182; 144/134 D; 144/136 C; 408/241 S; 409/218
[58] Field of Search ............... 409/178, 180, 182, 218; 144/134 D, 136 C; 408/241 S

[56] References Cited

U.S. PATENT DOCUMENTS

| | | | |
|---|---|---|---|
| 1,874,232 | 8/1932 | Groene et al. | 409/182 |
| 3,443,479 | 5/1969 | Hawley et al. | 144/136 C X |
| 4,239,428 | 12/1980 | Berzina | 409/182 |
| 4,566,830 | 1/1986 | Maier et al. | 409/182 |
| 4,652,191 | 3/1987 | Bernier | 409/182 |

FOREIGN PATENT DOCUMENTS

2124536 2/1984 United Kingdom .

Primary Examiner—Z. R. Bilinsky
Attorney, Agent, or Firm—Lowe, Price, LeBlanc, Becker & Shur

[57] ABSTRACT

A portable electric tool including an electric motor for driving a cutter to cut an object to be machined. The electric tool comprises a bracket for supporting the electric motor and handles attached to handle-mounting sections of the bracket for keeping the electric tool in cutting operation. Also included in the electric tool is a coupling mechanism for mechanically coupling each of the handles to each of the handle-mounting sections of the bracket. The coupling mechanism includes first and second annular members which are respectively attached to the handle-mounting section thereof and the handle so as to be coaxially arranged in confronting relationship to each other. Each of the first and second annular members has elongated recess portions and elongated projection portions which are alternately and successively arranged at a predetermined angular interval with respect to its own center. The elongated recess portions and projection portions of the first annular member are arranged to be engaged with the elongated projection portions and recess portions of the second annular member so as to provided a desirable mounting angle of the handle with respect to the bracket.

5 Claims, 8 Drawing Sheets

PORTABLE ELECTRIC ROUTER

BACKGROUND OF THE INVENTION

The present invention relates generally to an electric cutting tool, and more particularly to a portable electric router having a handle-mounting angle adjustable mechanism and a cut-depth adjustable mechanism.

An important aspect in the cutting tool art relates to the need for ease and simplicity in operation. A cutting tool such as a portable electric router is generally arranged so that an operator operates handles of the electric router by hand in a cutting operation. There is a problem which arises with conventional electric routers, however, in that, when operating at a low position, the wrists of the operator are subject to possible unnatural loads which thereby lower the safety and operational performance, because the mounting angle of the handles with respect to the router body is not arranged to be adjustable in accordance with variations in the operating position. In addition, in a conventional portable electric router, difficulty is encountered in meeting the requirement for easily and accurately setting the depth of cut for an object to be machined. Thus, an improvement is required from the viewpoint of adequately adjusting the handle mounting angle and easily and accurately setting the cutting depth of the object.

SUMMARY OF THE INVENTION

It is therefore an object of the present invention to provide a portable electric router which is capable of adequately adjusting the handle mounting angle in accordance with its operating position and easily and accurately setting the cutting depth of the object in cutting operation.

In accordance with the present invention, there is provided a portable electric tool including an electric motor for driving a cutter to cut an object to be machined, the electric tool comprising: a bracket for supporting the electric motor; handles attached to handle-mounting sections of the bracket for holding the electric tool in cutting operation; and a coupling mechanism for mechanically coupling each of the handles to each of the handle-mounting sections of the bracket, the coupling mechanism including first and second annular members which are respectively attached to the handle-mounting section thereof and the handle so as to be coaxially arranged in confronting relationship to each other, each of the first and second annular members having elongated recess portions and elongated projection portions which are alternately and successively arranged at a predetermined angular interval with respect to its own center, the elongated recess portions and projection portions of the first annular member being arranged to be engaged with the elongated projection portions and recess portions of the second annular member so as to provide a desirable mounting angle of the handle with respect to the bracket.

The coupling mechanism further includes a handle set screw for setting the handle to the bracket by thrusting it into a threaded hole of the handle-mounting section of the bracket after inserting it into a through-hole of the handle. In addition, the coupling mechanism further includes limiting means for limiting rotation of the handle with respect to the bracket, the limiting means comprising a groove formed in a circumferential surface of the handle-mounting section of the bracket and a projection formed on the handle. The groove has a predetermined length and the projection is arranged to be loosely engaged with the groove when the handle is coupled to the handle-mounting section of the bracket, so that the projection is rotatable along the groove and in a range corresponding to the length of the groove.

In accordance with the present invention, there is further provided a portable electric tool including an electric motor for driving a cutter to cut an object to be machined, the electric tool comprising a cutting depth adjustable mechanism which is provided in a space formed by a housing for encasing the electric motor and a bracket for supporting the electric motor, the cutting depth adjustable mechanism including a stopper pole extending along the longitudinal axis of the electric tool and having a first rack, a scale plate extending along the longitudinal axis thereof and having a second rack, and a knob-pinion assembly comprising a knob section and a pinion section and being arranged to be movable in directions of its own axis, the pinion section of the knob-pinion assembly having first and second toothed wheels, either of which are respectively arranged so as to be engageable with either of the first or second racks of the stopper pole and the scale plate in accordance with the movement of the knob-pinion assembly, whereby the stopper pole and the scale plate are respectively movable along the longitudinal axis of the electric tool in accordance with rotations of the first and second toothed wheels caused by rotation of the knob section of the knob-pinion assembly.

BRIEF DESCRIPTION OF THE DRAWINGS

The present invention will be described in further detail with reference to the accompanying drawings, in which.

DETAILED DESCRIPTION OF THE INVENTION

Figure 1:
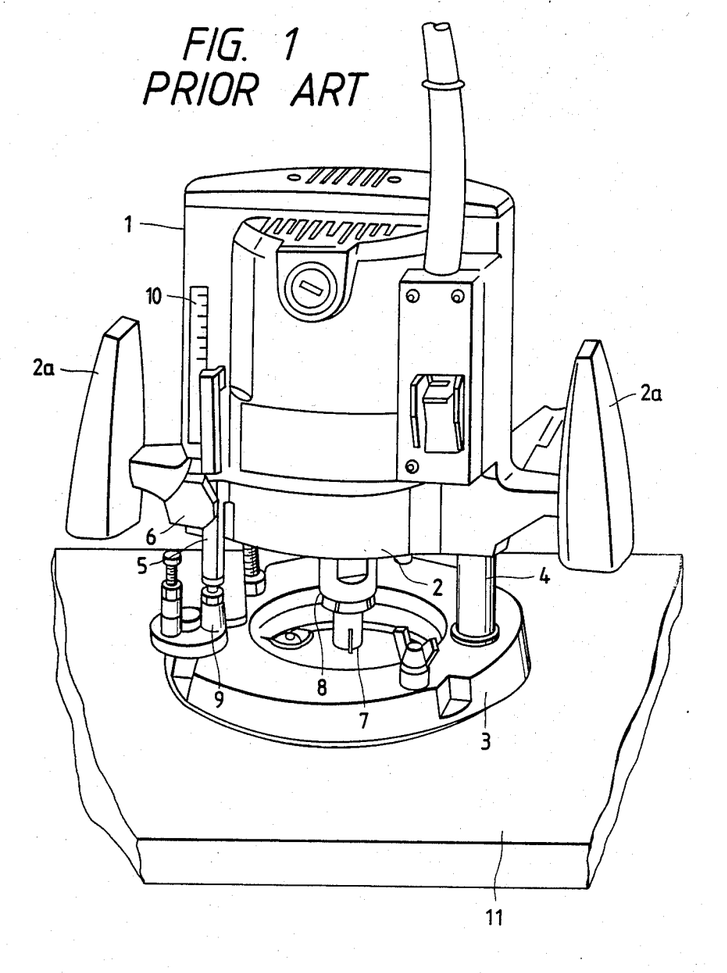
FIGS. 1 through 4 are illustrations for describing a prior art portable electric router.

Prior to describing embodiments of the present invention, a brief description will first be made hereinbelow with reference to FIGS. 1 to 4. FIG. 1 is a perspective view showing a conventional portable electric router. In FIG. 1, the conventional router comprises a housing 1 encasing a driving source such as an electric motor, a bracket 2 placed below the housing 1 to support a drive shaft of the electric motor which protrudes downwardly, and a base 3 connected through columns 4 to the bracket 2 and arranged to be brought into sliding contact with an object 11 to be machined. A cutter 7 is connected through a collet chuck 8 to one end portion of the drive shaft of the electric motor so as to direct downwardly. In the cutting operation, the operator maintains by hand a pair of handles 2a attached to both sides of the bracket 2 to operate the electric router. Here, in the conventional electric router the handles 2a are fixedly secured to the bracket 2 so as not to allow changing the handle mounting angle with respect thereto, as the fixing of the handle mounting angle causes the wrists of the operator to be subject to an unnatural load due to variation of the operating position, thereby resulting in the operator having a pain in the wrists.

Figure 2:
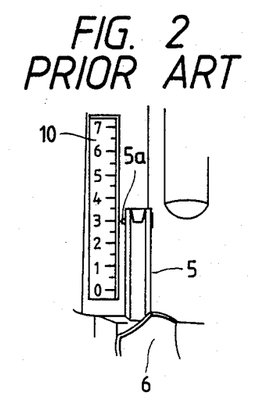

Referring again to FIG. 1, the bracket 2 has a through-hole formed to extend in directions of the axis of the electric router and a stopper pole 5 is fitted in the through-hole and held by a wing bolt 6 which is engaged with a screw hole extending in a direction normal to the axis of the through-hole. An interfering portion 9 is provided on the base 3 and under the stopper pole 5 so as to act as a positioning member of the stopper pole 5. As also illustrated in FIG. 2, the housing 1 is provided with a scale 10 which indicates the moving distance of the stopper pole 5 by engagement with an arrow member (pointer) 5a attached to a portion of the stopper pole 5. In setting the cutting depth, after the electric router is placed on a surface of the object 11 to be machined, the housing 1 is moved downwardly so as to cause the end of the cutter 7 to come into contact with the object 11. In this state, the stopper pole 5 is brought into contact with the interfering portion 9 so as to find a reference point, at which the cutting depth is zero, and then to determine the cutting depth with respect to the reference point through the scale 10. In this case, the operator is required to store the reference point and then add the cutting depth to the value corresponding to the reference point and further to manually control the stopper pole 5 so that the arrow member 5a thereof shows the addition value in the scale 10. This cutting-depth setting work is troublesome and difficulty is encountered to accurately setting the cutting depth.

Figure 3:
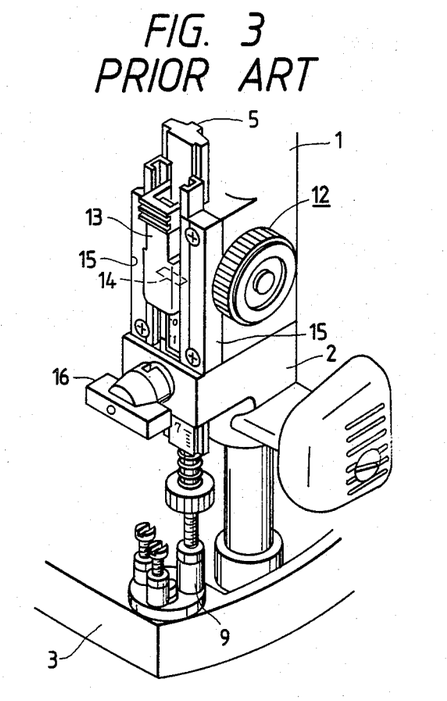
Figure 4:
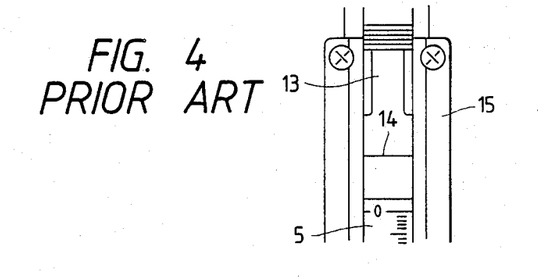
Figure 5:
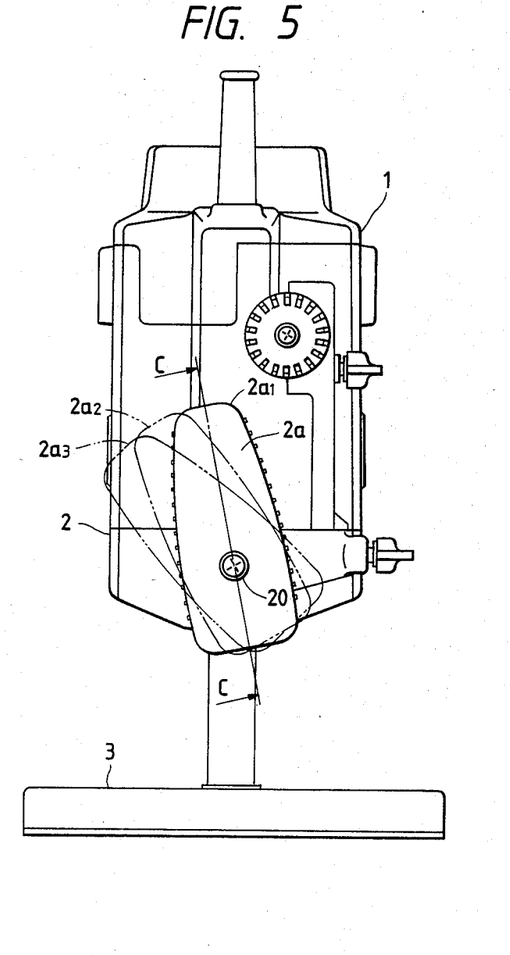
FIG. 5 is a side view showing a portable electric router according to a first embodiment of the present invention.

FIGS. 3 and 4 shows another means to determine the cutting depth. Here, the stopper pole 5 is arranged to be equipped with a scale and to be movable by means of a knob pinion assembly 12 having a toothed wheel engaged with a rack of the stopper pole 5, whereby a mark 14 of a sliding member 13 is movable. In this instance, the cutting depth is adjusted with the mark 14 of the sliding member 13 being coincident with the zero position of the scale of the stopper pole 5. In FIGS. 3 and 4, numerals 15 and 16 respectively represent a front cover and a wind bolt. In setting the cutting depth, similarly, the positioning between the mark 14 of the sliding member 13 and the scale of the stopper pole 15 depends upon manual work, thereby resulting in difficulty being encountered to effect the fine adjustment.

Figure 6:
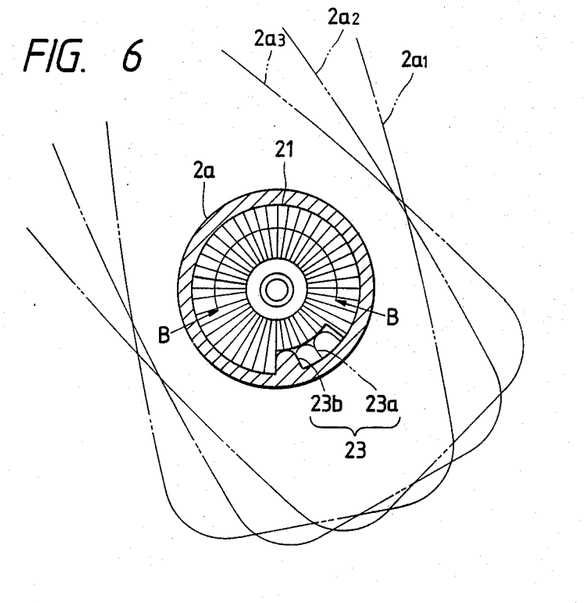
FIG. 6 is a cross-sectional view showing a handle mounting section of the FIG. 5 electric router.
Figure 7:
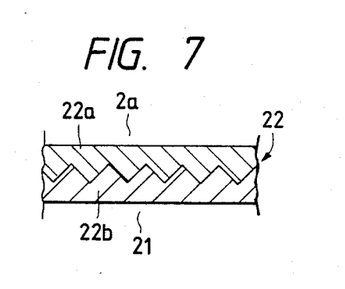
FIG. 7 is a cross-sectional view taken along a line B—B in FIG. 6.
Figure 8:
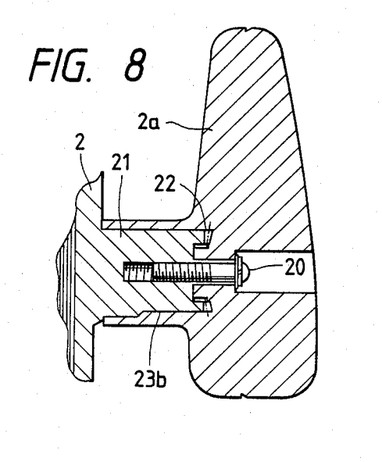
FIG. 8 is a cross-sectional view taken along a line C—C in FIG. 5.

Referring now to FIGS. 5 through 8, there is illustrated a portable electric router according to a first embodiment of the present invention. Parts corresponding to those of the above-described conventional electric router are marked with the same reference numerals and the description thereof will be omitted for brevity. In the electric router shown in FIGS. 5 to 8, each of handles 2a is attached to a handle mounting section 21 of a bracket 2 through a handle setting mechanism comprising a handle set screw 20 for fixing or supporting the handle 2a with respect to the handle mounting section 21, a mounting angle adjusting device 22 for causing the handle 2a to be allowed to take a plurality of mounting angles 2a1 to 2a3 in FIGS. 5 and 6, and a limiting device 23 for limiting the handle mounting angle to be maintained in a predetermined angular range. More specifically, each of the handles 2a is fixedly secured by the handle set screw 20 to the handle mounting section 21 of the bracket 2 with the mounting angle adjusting device 22 being interposed therebetween as shown in FIG. 8. The handle mounting section 21 thereof has a rod-like configuration whose cross section is circular and horizontally protrudes from a portion of the bracket 2. The handle 2a has a cylindrical portion which has an inner diameter so as to be engageable with the handle mounting section 21. The mounting angle adjusting device 22 is provided between the end surface of said handle mounting section 21 and the bottom surface of the cylindrical portion of the handle 2a as shown in FIG. 8. The mounting angle adjusting device 22, as illustrated in FIG. 7, comprises a ratchet, for example, including a pair of first and second sections 22a and 22b, each having elongated recess portions and elongated projection portions which are alternately and successively arranged at a predetermined angular interval with respect to its center portion. The first section 22a of the ratchet is attached to the end surface of the handle mounting section 21 and the second section 22b thereof is attached to the bottom surface of the cylindrical portion of said handle 2a whereby the first and second sections 22a and 22b of the ratchet are positioned to be in opposed relationship to each other. When the handle 2a is engaged with the handle mounting section 21 and fastened thereto by means of the handle set screw 20, the recess portions of the first section 22a are arranged so as to be engaged with the projection portions of the second section 22b. In adjusting the handle mounting angle, the handle set screw 20 is once loosened and again fastened after the handle 2a is rotated about the axis of the handle set screw 20 so as to take a desirable mounting angle with respect to the bracket 2.

Furthermore, the portable electric router is equipped with a limiting device 23, that is, as illustrated in FIG. 6, a protruding portion 23b is formed on the inner surface of the cylindrical portion of the handle 2a so as to be fitted in a groove portion 23a formed in the handle mounting section 21 in its circumferential directions to have a predetermined angular range. The protruding portion 23b is movable in the groove portion 23a in the predetermined angular range so as to limit the rotation of the handle 2a into a predetermined range even if the first and second sections of the ratchet are disengaged with each other.

Figure 9:
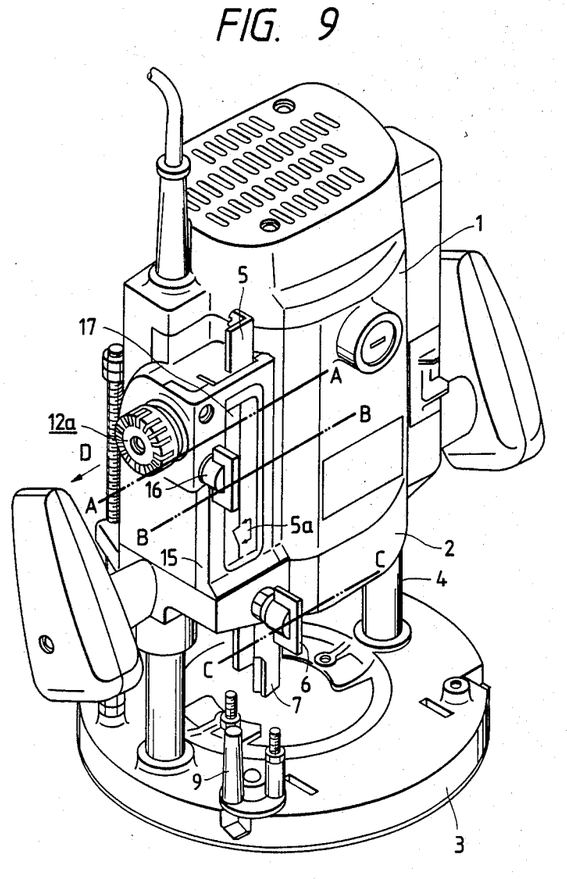
FIG. 9 is a perspective view showing a portable electric router according to a second embodiment of the present invention.
Figure 10:
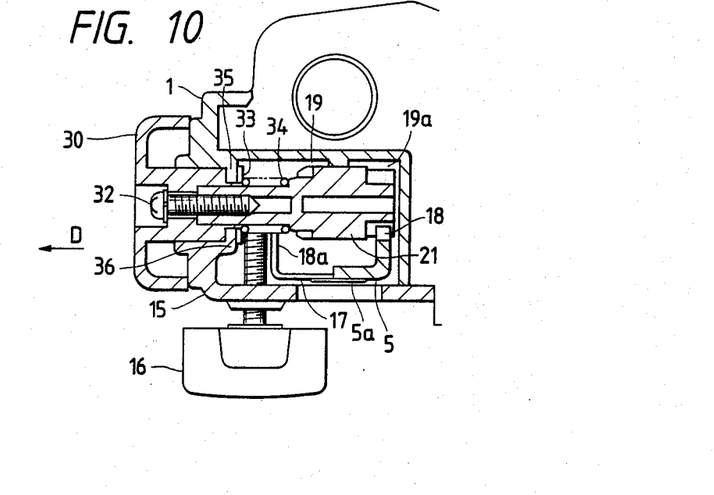
FIG. 10 is a cross-sectional view taken along a line A—A in FIG. 9.
Figure 11:
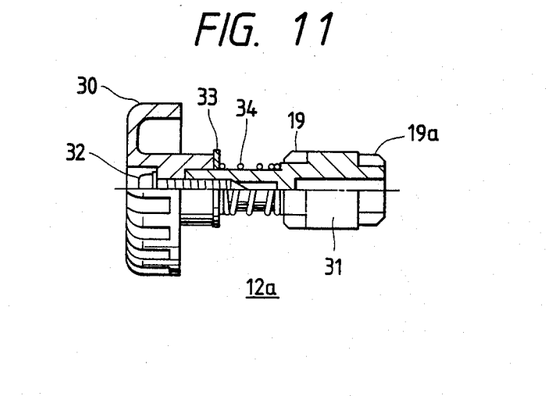
FIG. 11 is an illustration of a knob-pinion assembly used in the second embodiment.

A second embodiment of the present invention will be described hereinbelow with reference to FIGS. 9 through 13. Parts corresponding to those in the above-mentioned conventional routers and the first-mentioned embodiment are marked with the same numerals and the description thereof will be omitted for brevity. In FIG. 9 which is a perspective view showing a portable electric router according to the second embodiment of this invention, a housing 1, a front cover 15 and bracket 2 are arranged so as to form a chamber for encasing a pinion section of a knob-pinion assembly 12a, a portion of a stopper pole 5 and a scale plate 17. As illustrated in FIG. 10, the stopper pole 5 and scale plate 17 respectively have racks 18 and 18a which are engageable with toothed wheels 19a and 19 of the knob-pinion assembly 12a to allow the stopper pole 5 and the scale plate 17 to be movable up and down. This arrangement attains a cutting depth adjustable mechanism which is capable of simply and accurately setting the depth of cut with respect to an object to be machined. That is, the cutting depth adjustable mechanism comprises the knob-pinion assembly 12a including a knob 30 integrally coupled, by means of a set screw 32, to a pinion 31 having the toothed wheels 19 and 19a as illustrated in FIG. 11. Between the knob 30 and the pinion 31 is provided a washer 33 which is biased by the aid of a spring 34 in the left direction in the Figure, that is, so that the washer 33 is pressed against an end portion of the knob 30 in a direction of the axis of the pinion 31. The knob-pinion assembly 12a is loosely engaged with the housing 1 and the front cover 15 in such manner as to place a protruding portion 35 of the housing 1 and a protruding portion 36 of the front cover 15 between the end surface of the knob 30 and the washer 33 so as to be rotatable with respect thereto and movable in a directions of its own axis against or by the biasing force of the spring 34. The rack 18 of the stopper pole 3 is engaged with the toothed wheel 19a of the knob pinion assembly 12a so that rotation of the knob pinion assembly 12a results in the stopper pole 5 being moved upwardly and downwardly. On the other hand, the scale plate 17 similarly includes the rack 18a and, when the knob pinion assembly 12a is drawn against the biasing force of the spring 34 in a direction indicated by an arrow D in FIG. 10, the toothed wheel 19 is engaged with the rack 18a whereby the scale plate 17 is movable up and down in accordance with rotation of the knob 30 as well, as the stopper pole 5.

Figure 12:
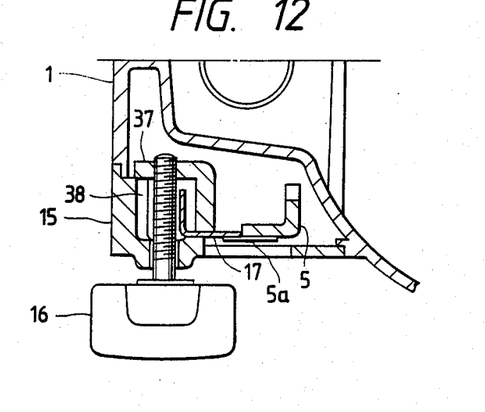
FIG. 12 is a cross-sectional view taken along a line B—B in FIG. 9.

As shown in FIG. 12, the front cover 15 is equipped with a through-hole extending in a direction normal to the direction of the axis of the electric router, and a wing bolt 16 is inserted into the through-hole of the front cover 15 and then fixedly screwed with respect to a scale stopper 37 so that the scale stopper 37 is directed to the front cover 15 in accordance with rotation of the wind bolt 16 in one direction and stopped in response to coming into contact with a seat 38 of the front cover 15 and the scale plate 17. That is, the scale plate 17 is fixed by it being sandwiched between the front cover 15 and the scale stopper 37.

Figure 13:
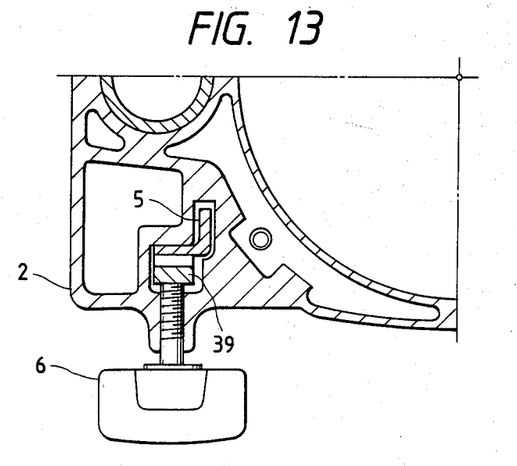
FIG. 13 is a cross-sectional view taken along a line C—C in FIG. 9.

In FIG. 13, a portion of the stopper pole 5 is inserted into a hole formed in the bracket 2 and a stopper piece 38 having a spring function is disposed in the hole of the bracket 2 so as to be positioned between the wing bolt 6 and the stopper pole 5. When rotating the wing bolt 6 in the fastening direction, the stopper piece 39 is pressed against the stopper pole 5 whereby the stopper pole 5 is fixedly secured to the bracket 2.

A description will be set forth hereinbelow in terms of adjustment of the depth of cut in the portable electric router with the above-described arrangement. First, the housing 1 is moved downwardly until an end portion of the cutter 7 comes into contact with an object to be machined and fixed at the contacting position. Thereafter, the wind bolt 6 is loosened to allow the stopper pole 5 to come into contact with the interfering portion 9. This position results in the cutting depth being zero. In this state, the knob-pinion assembly 12a is drawn in the direction of the arrow D so as to cause the scale plate 17 to be moved upwardly and downwardly and an arrow member (pointer) 5a of the stopper pole 5 is adjusted to show the zero position of the scale plate 17. In this instance, the wing bolt 6 is fastened so as to fix the scale plate 17. Thereafter, the knob-pinion assembly 12a is released so as to be restored to the original position so that the stopper pole 5 is engaged with the toothed wheel 19a thereof. When being at the original position, the stopper pole 5 is moved by rotation thereof. Thus, the operator moves the arrow member 5a from the zero point of the scale plate 17 in accordance with the value of a required cutting depth and rotates the wing bolt 6 to fix the stopper pole 5. With these operations, the adjustment of the cutting depth is completed. This adjustment operation involves memorizing the zero position, and since the movements of the stopper pole 5 and the scale plate 17 can be enlarged by the ratio of the diameter of the knob 30 and the pitch diameter of the toothed wheel, it is possible to simply and accurately perform the scale positioning.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A portable electric router including an electric motor with a drive shaft for driving a cutter to cut an object to be machined, said router comprising:
   a bracket for supporting said electric motor;
   a base connected to said bracket and arranged to be brought into sliding contact with said object to be machined;
   a cutter connected to one end portion of a drive shaft of said electric motor;
   handles pivotally attached to handle-mounting sections of said bracket and in substantially the same plane for holding said router in cutting operation; and
   a coupling mechanism for mechanically coupling each of said handles to each of said handle-mounting sections of said bracket, said coupling mechanism including first and second annular members which are respectively attached to said handle-mounting section thereof and said handle so as to be coaxially arranged in confronting relationship to each other, each of said first and second annular members having elongated recess portions and elongated projection portions which are alternately and successively arranged at a predetermined angular interval with respect to its own center, said elongated recess corporations and projection portions of said first annular member being arranged to be engaged with said elongated projection portions and recess portions of said second annular member so as to provide a desirable mounting angle of said handle with respect to said bracket.

2. A portable electric router as claimed in claim 1, wherein said coupling mechanism further includes a handle set screw for setting said handle to said bracket by thrusting it into a threaded hole of said handle-mounting section of said bracket after inserting it into a through-hole of said handle.

3. A portable electric router as claimed in claim 1, wherein said coupling mechanism is composed of a ratchet.

4. A portable electric router as claimed in claim 1, wherein said coupling mechanism further includes limiting means for limiting rotation of said handle with respect to said bracket, said limiting means comprising a groove formed in a circumferential surface of said handle-mounting section of said bracket and a projection formed on said handle, said groove having a predetermined length, and said projection being arranged to be loosely engaged with said groove, when said handle is coupled to said handle-mounting section of said bracket, so that said projection is rotatable along said groove and in a range corresponding to the length of said groove.

5. A portable electric router including an electric motor for driving a cutter to cut an object to be machined, said router comprising; a cutting-depth adjustable mechanism which is provided in a space formed by a housing for encasing said electric motor and a bracket for supporting said electric motor, a base connected to said bracket and arranged to be brought into sliding contact with said object to be machined; said cutting-depth adjustable mechanism including a stopper pole extending along the longitudinal axis of said router and having a first rack, a scale plate extending along the longitudinal axis thereof and having a second rack, and a knob-pinion assembly comprising a knob section and a pinion section and being arranged to be movable in directions of its own axis, said pinion section of said knob-pinion assembly having first and second toothed wheels, either of which are respectively arranged so as to be engageable with either of said first or second racks of said stopper pole and said scale plate in accordance with the movement of said knob-pinion assembly, whereby said stopper pole and said scale plate are respectively movable along the longitudinal axis of said router in accordance with rotations of said first and second toothed wheels caused by rotation of said knob section of said knob-pinion assembly.

* * * * *